(12) United States Patent
Kirkpatrick et al.

(10) Patent No.: US 6,559,933 B1
(45) Date of Patent: May 6, 2003

(54) METHOD AND APPARATUS FOR DETECTING A TERRAIN-MASKED HELICOPTER

(75) Inventors: Philip L. Kirkpatrick, Dumont, NJ (US); Richard P. Krulis, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/010,268

(22) Filed: Dec. 6, 2001

(51) Int. Cl.[7] ................................................. G01P 3/36
(52) U.S. Cl. ...................... 356/28.5; 356/5.01; 356/5.1; 356/141.1
(58) Field of Search ....................... 356/28, 28.5, 342, 356/5.01–5.15, 141.1; 342/104, 26, 27

(56) References Cited

U.S. PATENT DOCUMENTS

| | | | | |
|---|---|---|---|---|
| 4,652,122 A | * | 3/1987 | Zincone et al. ............ 356/28.5 |
| 4,729,737 A | * | 3/1988 | Reagan et al. | |
| RE33,152 E | * | 1/1990 | Atlas ............................ 342/26 |
| 5,049,756 A | * | 9/1991 | Colstoun et al. | |
| 5,208,600 A | * | 5/1993 | Rubin .......................... 342/26 |
| 5,424,823 A | * | 6/1995 | Nettles et al. ............. 356/5.01 |
| 6,070,461 A | * | 6/2000 | Gjessing et al. | |

FOREIGN PATENT DOCUMENTS

| | | | |
|---|---|---|---|
| JP | 2001263994 | * | 9/2001 |
| JP | 2001264440 | * | 9/2001 |

\* cited by examiner

*Primary Examiner*—Stephen C. Buczinski

(57) ABSTRACT

A robot sentry with a scanning laser observes the sky just above the geographic skyline looking for a vertical airflow pattern characteristic of the rotor inflow to a helicopter rotor. The presence of this vertical airflow pattern indicates the probable presence of a reconnaissance helicopter that is using terrain masking.

13 Claims, 10 Drawing Sheets

FIG. 9
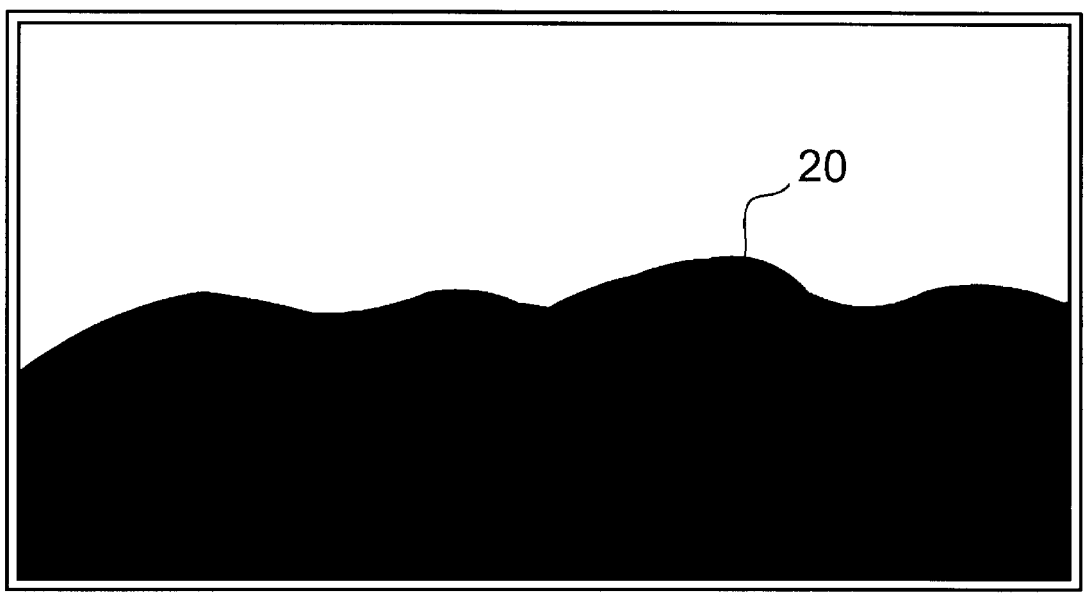
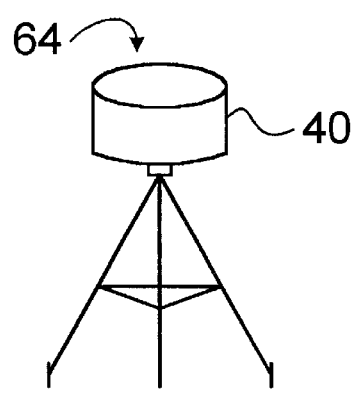

METHOD AND APPARATUS FOR DETECTING A TERRAIN-MASKED HELICOPTER

CROSS-REFERENCE TO RELATED APPLICATIONS

Not Applicable.

Federally Sponsored Research or Development

Not Applicable.

BACKGROUND OF THE INVENTION

1. Technical Field

This invention relates to the field of surveillance and more specifically to the detection of helicopters that potentially represent a threat.

2. Background Art

In the field of electronic surveillance, particularly on the modern battle field, helicopters such as the American Apache helicopter, the European Tiger helicopter as well as undoubtedly Russian and other countries' helicopters use mast-mounted sights and terrain masking as a way of acquiring a target while remaining undetected. A typical flight scenario would be for a reconnaissance helicopter to fly very low to the ground while approaching a potential target. The helicopter would then expose a minimal portion of itself, such as a mast-mounted sight, which is analogous to observing a surface ship from a submarine. In the case of the helicopter, terrain between the helicopter and the intended target 'masks' the helicopter's approach.

In the unrelated field of aerodynamics, the operation of a helicopter is fairly well understood. It is an immutable principle of physics that helicopters—indeed any 'heavier-than-air-craft'—can only fly because the airfoils, at any given instant, accelerate a mass of air downward that is at least equal to the mass of the aircraft.

On airplanes, the airfoils (called 'wings') are bolted firmly to the fuselage at a fixed angle and the entire craft is accelerated along the runway until sufficient 'relative airflow' is generated over the wings that they can deflect a sufficient mass of air to take off. "Lift" is the equal and opposite reaction to that downward deflection of the air.

Helicopter airfoils (called 'main rotors') are rotated about a hub with a feathering hinge at the root, which allows the 'angle of attack' to be increased or decreased, both 'cyclically' and 'collectively'. Because these rotating wings are capable of generating 'relative airflow' solely due to the speed of rotation, it is not necessary for helicopters to have forward speed in order to fly.

But whether we talk about 'rotary-wing' or 'fixed-wing' aircraft, the greater the forward speed with which the aircraft flies through the air, the greater the volume of air per unit of time that the lifting airfoils will act upon. The greater the mass of air deflected, the less vertical acceleration must be imparted to that air mass in order to provide the 'lift' necessary to fly. For example, a crop-spraying airplane flying over a field at only one or two meters above the vegetation will barely rustle the leaves.

On the other hand, slow flying aircraft interact with a smaller volume of air per unit of time and therefore it is necessary to accelerate that air to a greater downward velocity in order to sustain lift. This is the case with a hovering helicopter—particularly a helicopter hovering well clear of the ground—where there is invariably a column of descending air beneath the craft. Hovering a helicopter 'out-of-ground-effect' requires more power than is required for forward flight or hover 'in-ground-effect' and is akin to trying to swim up a waterfall.

Referring to FIG. 1, the vertical velocity of the column of air, also known as the 'rotor intake' region 15, above a hovering or slow moving helicopter 10 depends upon several factors including surface wind, main rotor radius, and 'disc loading' (that is—the weight of the helicopter divided by the 'swept' area of the rotor disc). The mass of air entering the rotor intake region is necessarily equal to the mass of air exiting the rotor 'down wash' region 16 from the helicopter 10, where helicopter rotor down wash is a fairly well understood phenomenon. Larger helicopters not only have greater mass, but they generally have a higher 'disc loading' when compared to smaller helicopters. This is because other design influences limit the practical main rotor radius on large helicopters.

We have discovered a means of protecting a potential target by detecting helicopters that are using terrain masking to approach the target. Our invention uses the aerodynamic principles of helicopter flight to detect these helicopters before they have observed the target. Advantageously, our invention reveals the position of the helicopter to the potential target before the helicopter is aware that it has been detected. This invention addresses a long-felt need by ground troops for protection from approaching low flying helicopters.

SUMMARY OF THE INVENTION

A robot sentry with a scanning laser observes the sky just above the geographic skyline looking for a vertical airflow pattern characteristic of the rotor inflow to a helicopter rotor. The presence of this vertical airflow pattern indicates the probable presence of a reconnaissance helicopter that is using terrain masking. The robot sentry can be set up to survey the surrounding terrain, using for example a video camera to detect the contrast difference between a darker terrain and lighter sky. The robot sentry can automatically establish an 'observation line' by laser ranging to the geographic skyline or an operator can set the observation line based on local terrain features should as can be determined from a topographic map.

The helicopter is detected by drawing an imaginary line in space, aiming very short duration and small diameter laser pulses at various points along that line, detecting return signals from individual aerosol particles on that line, and correlating an area of vertically descending particles with the area of a helicopter rotor. Once the helicopter is detected, personnel in the area are alerted to the potential threat.

BRIEF DESCRIPTION OF DRAWINGS

Figure 1:
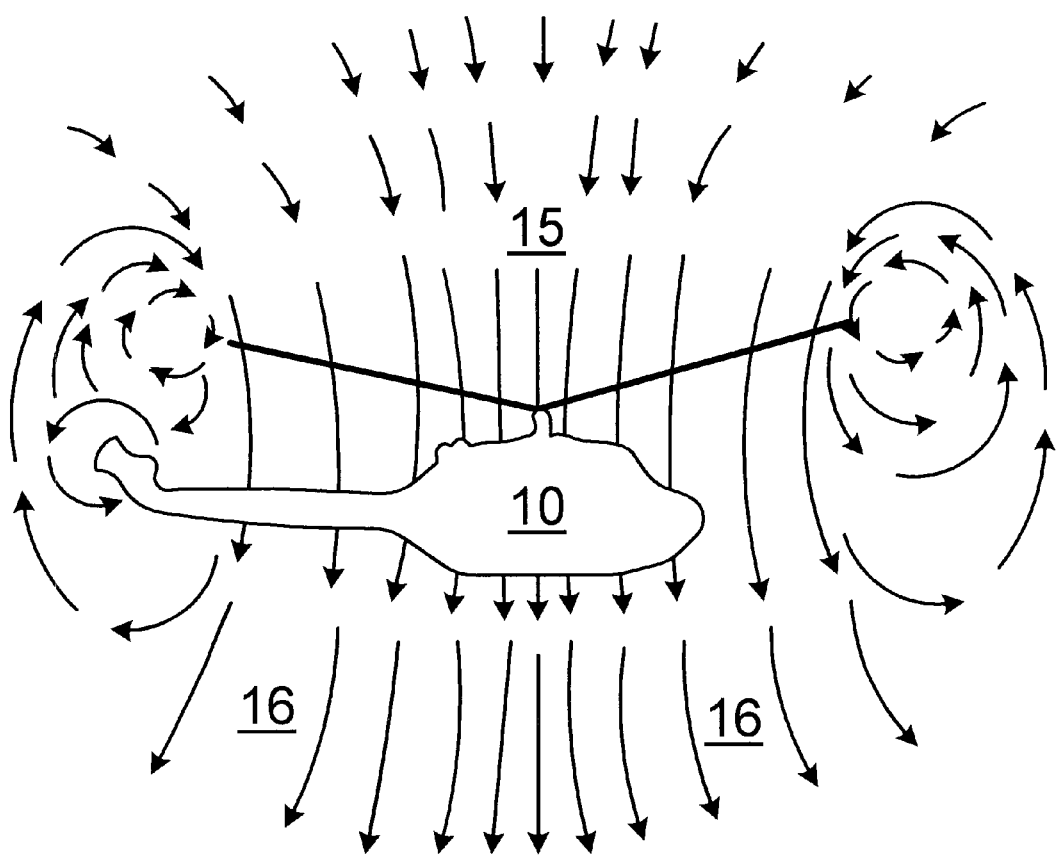

Brief Description of the Several Views of the Drawing

Figure 2:
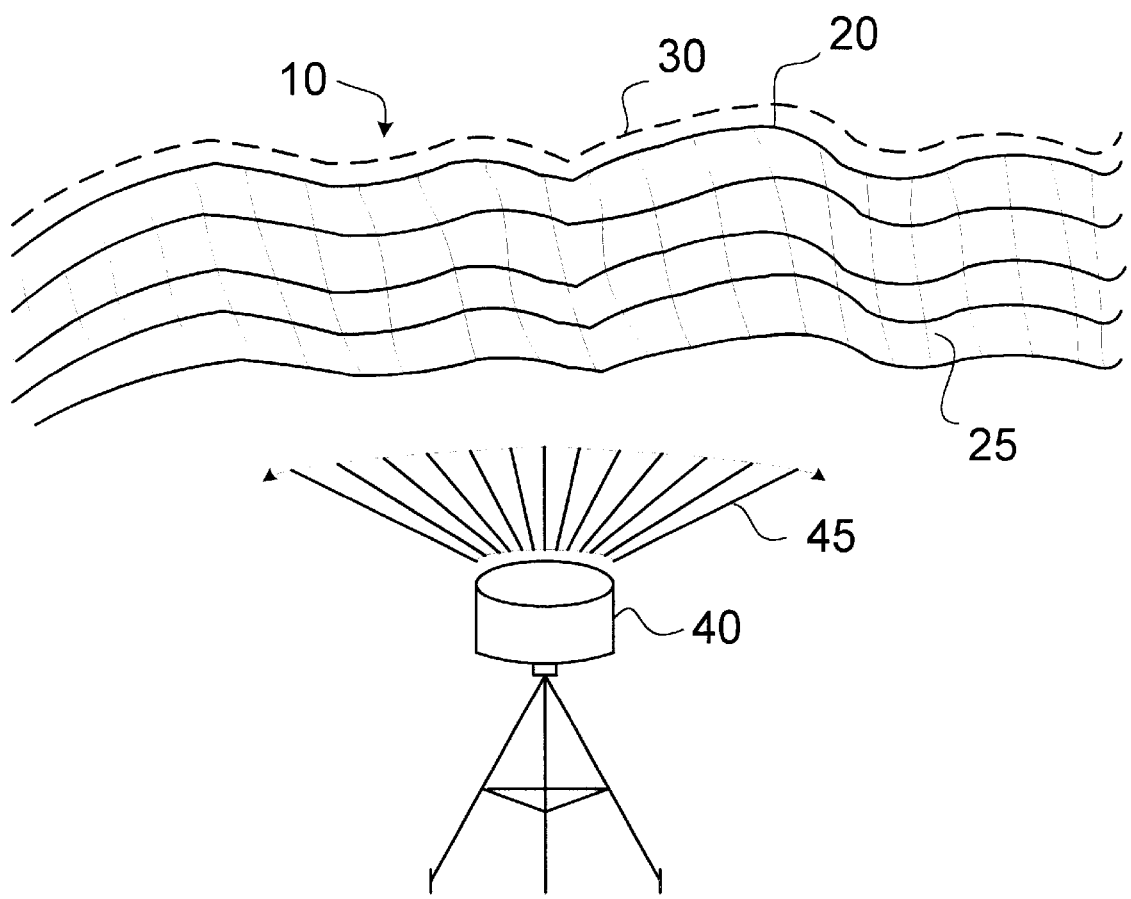
Figure 3:
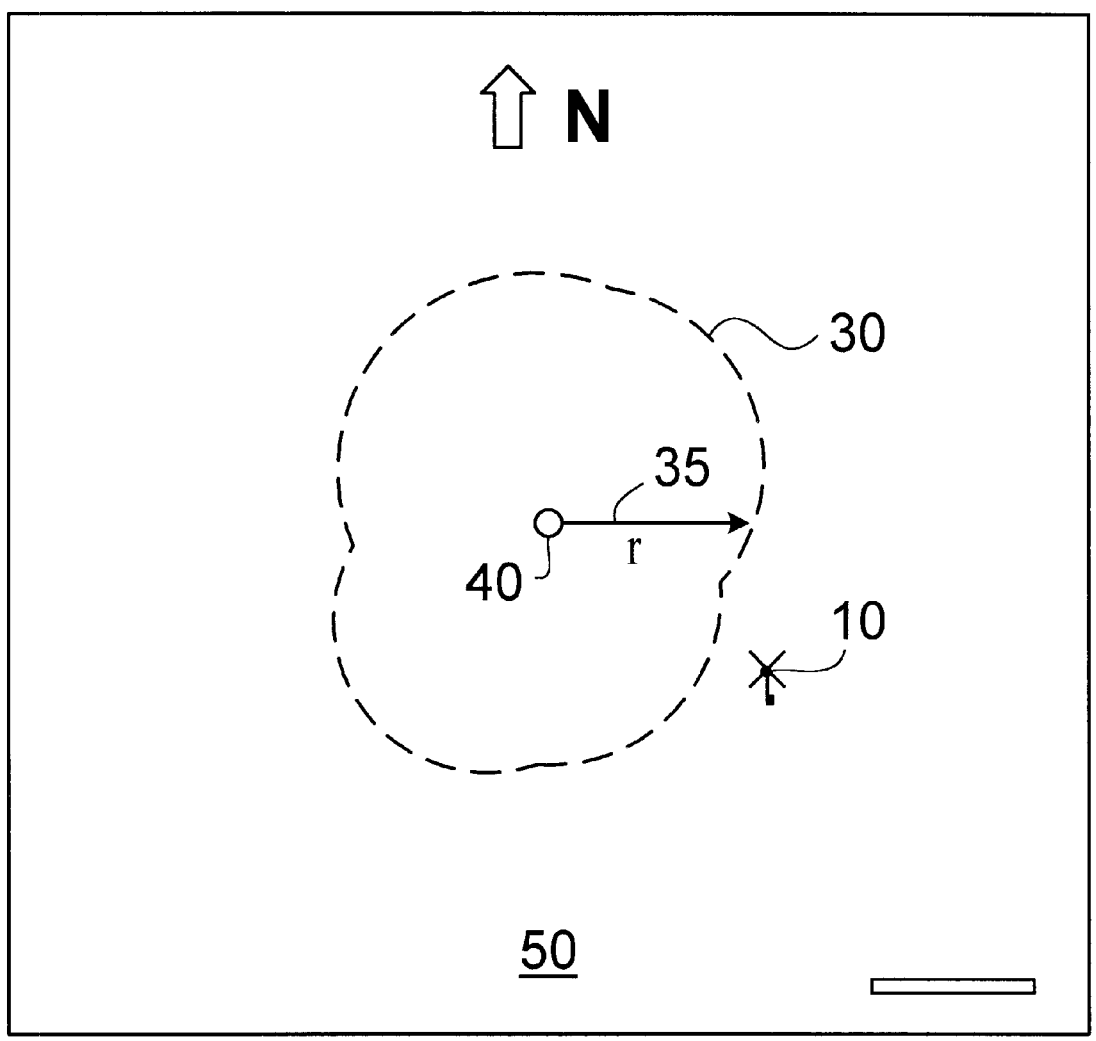

A more complete appreciation of this invention, and many of the attendant advantages thereof, will be readily apparent as the same becomes better understood by reference to the following detailed description when considered in conjunction with the accompanying drawings, wherein:

FIG. 1 illustrates the airflow around a hovering or slow flying helicopter as taught in the prior art;

FIG. 2 illustrates a robot sentry monitoring an observation line located just above a geographic skyline, in accordance with one illustrative embodiment of my invention; and FIG. 3 depicts the positions of the robot sentry, geographic skyline, and observation line as shown in FIG. 1, as they would be seen on a topographical map.

Figure 4:
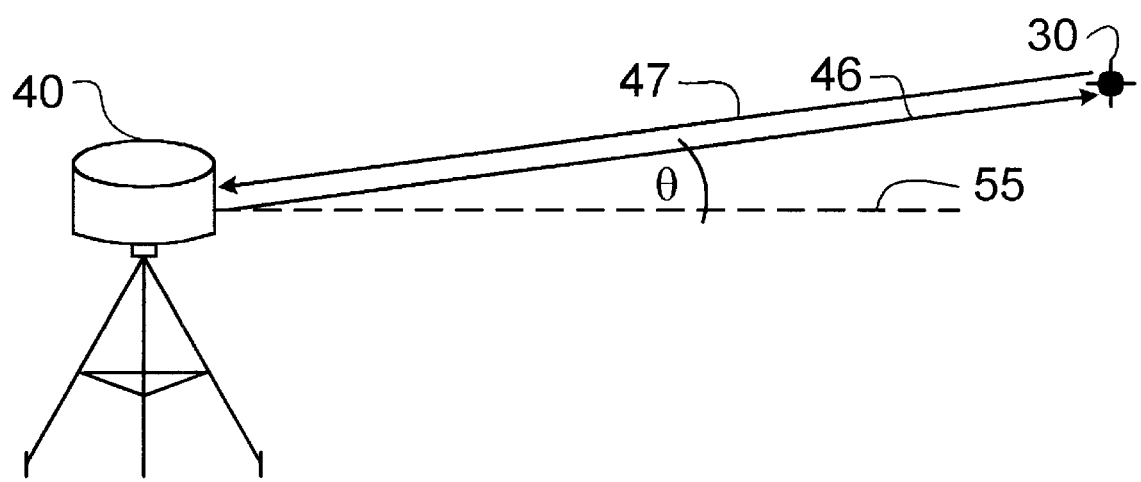

FIG. 4 depicts the angular relationship of positions of the robot sentry, and observation line as shown in FIG. 1, with respect to an individual laser beam.

Figure 5:
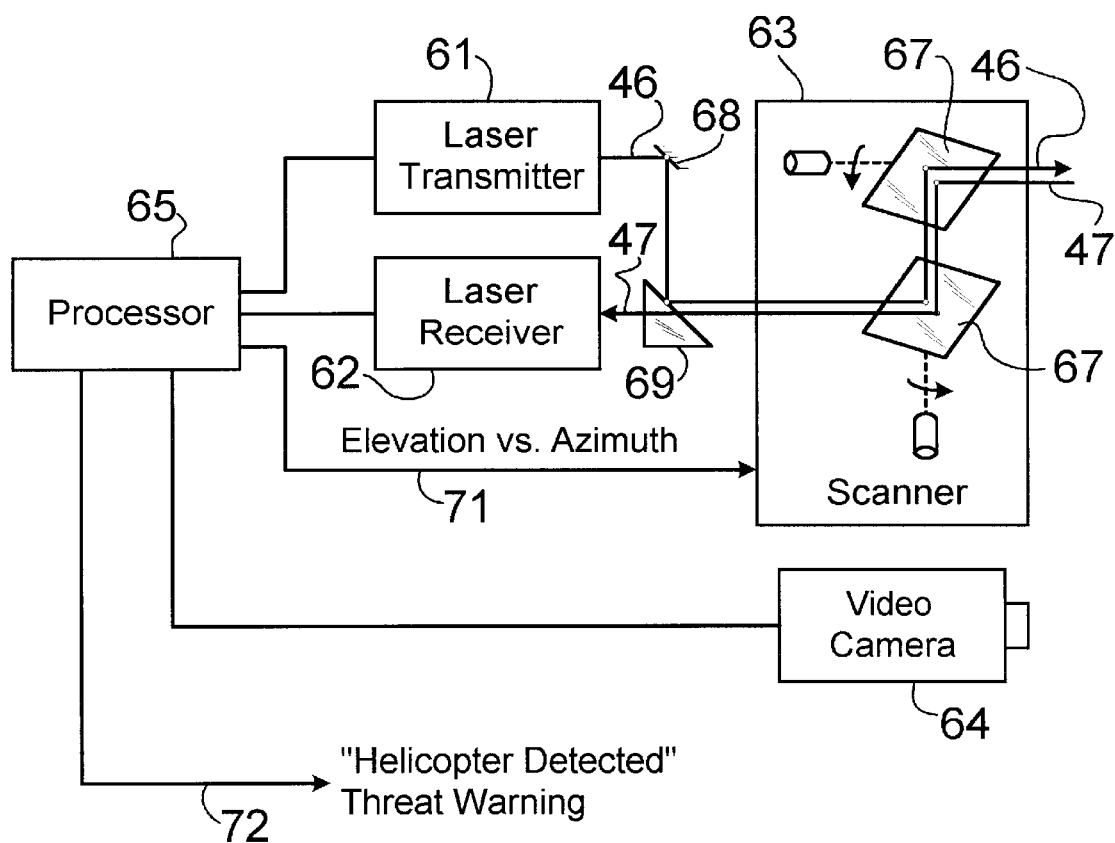

FIG. 5 illustrates a functional block diagram of the robot sentry according to one illustrative embodiment of our invention.

Figure 6:
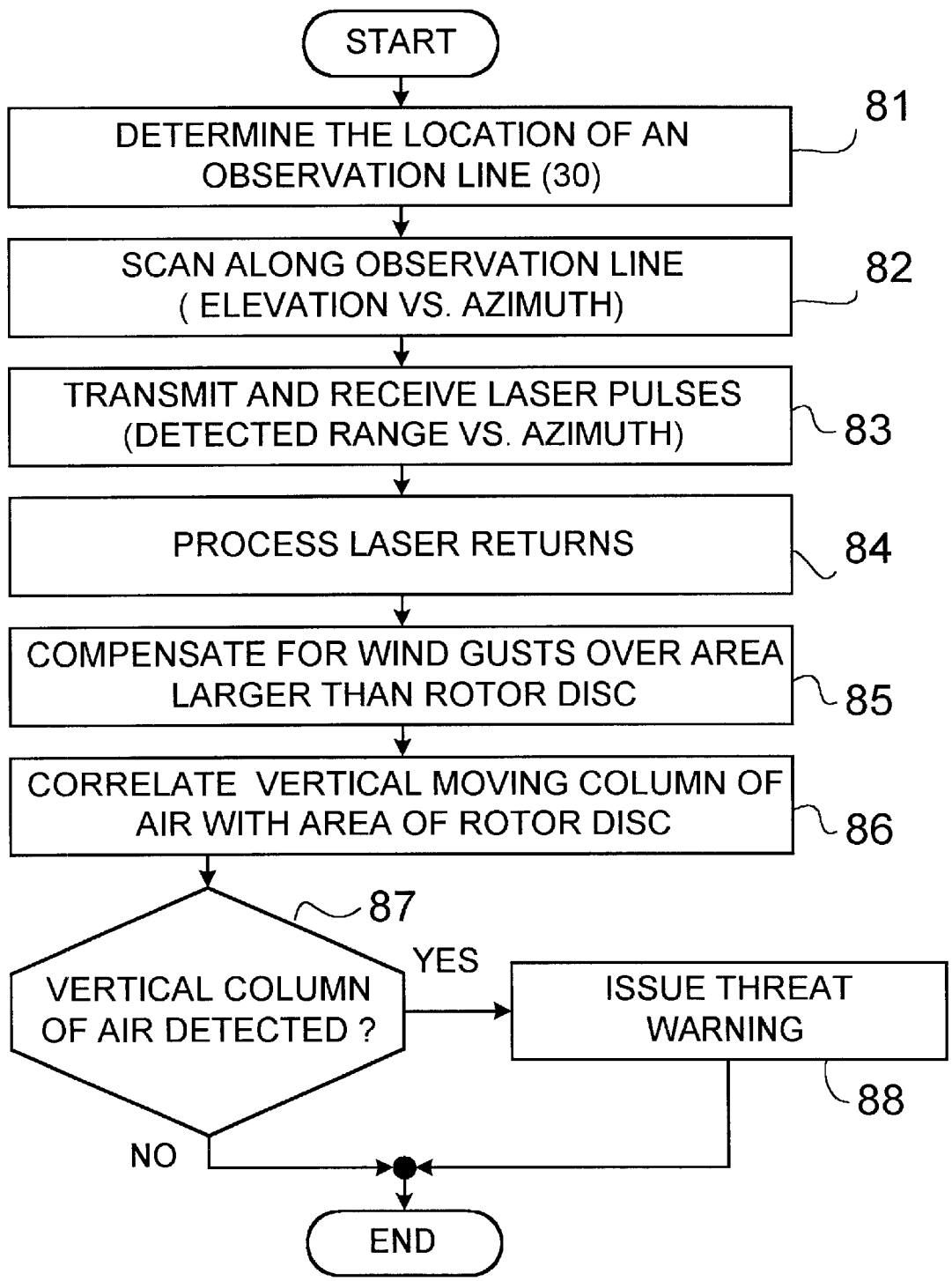

FIG. 6 is a flow chart showing the method steps performed by the robot sentry in detecting a helicopter.

Figure 7:
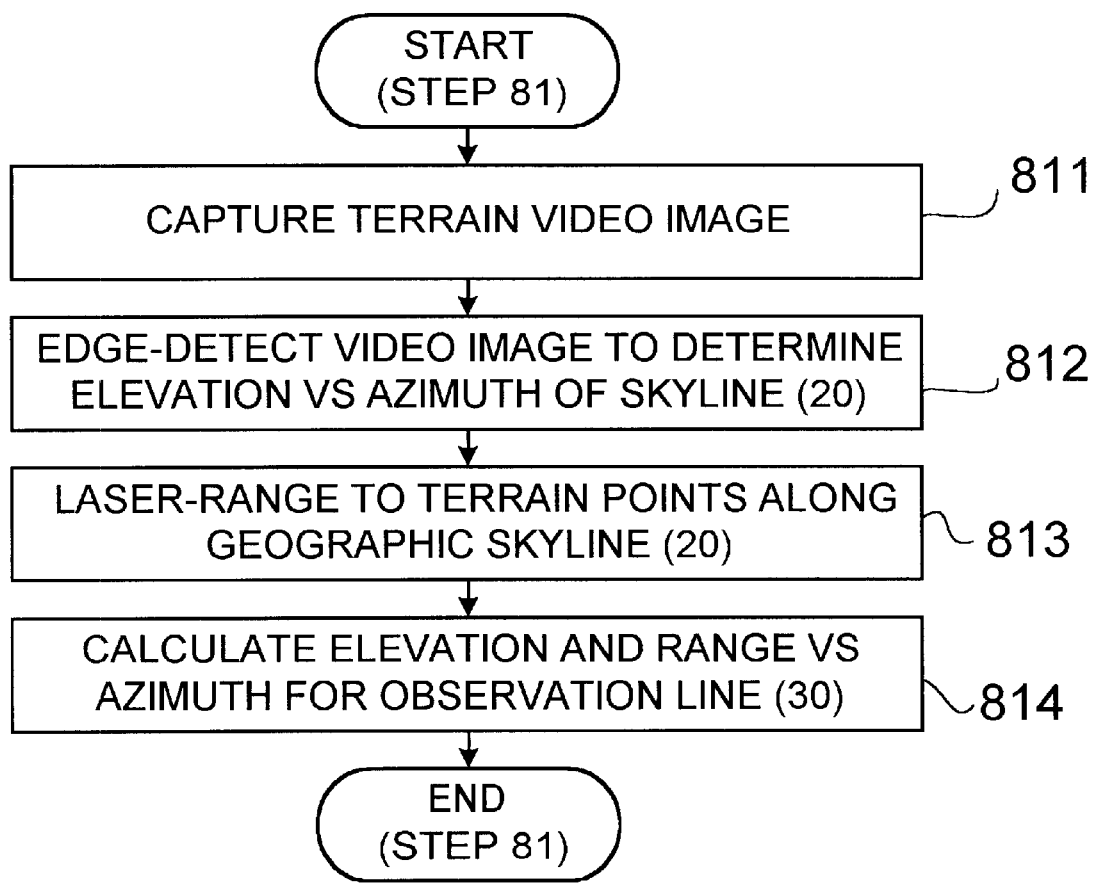
Figure 8:
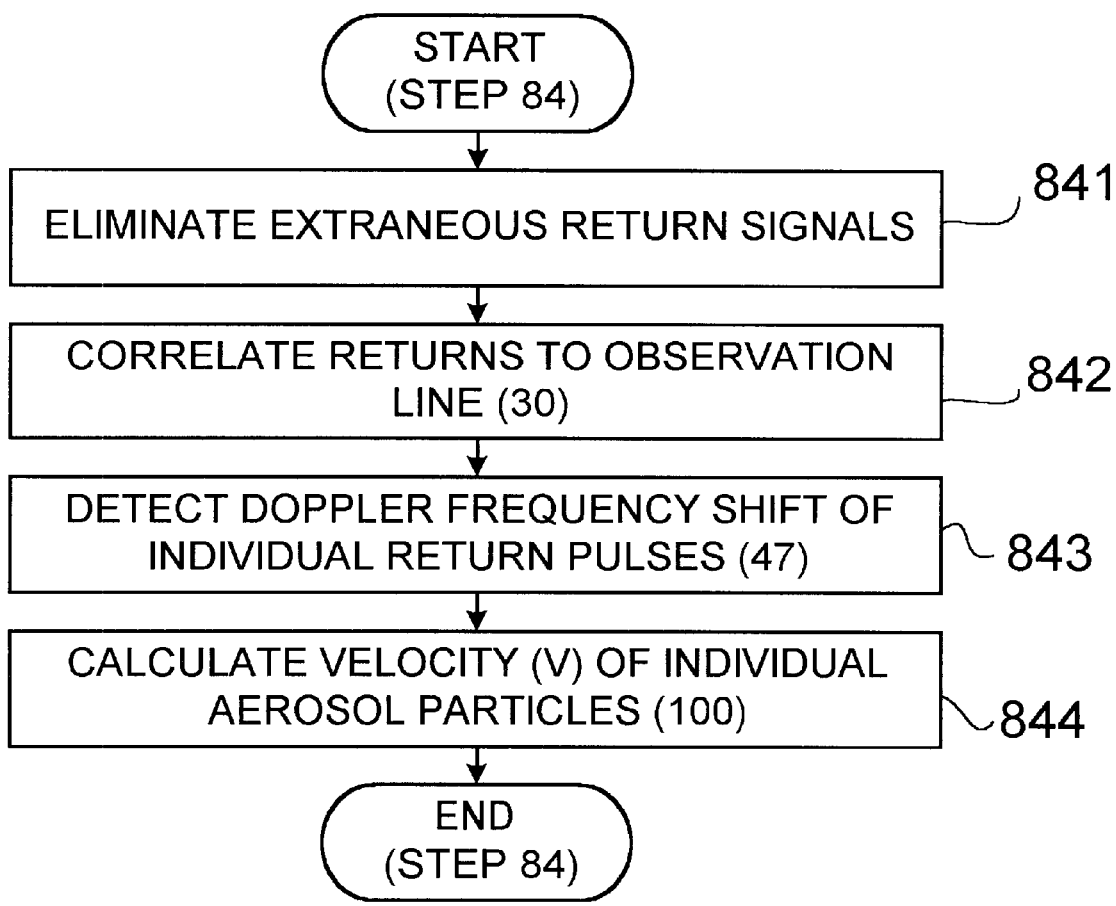

FIGS. 7 and 8 illustrate specific details of the procedure of FIG. 6, in accordance with the present invention.

FIG. 9 illustrates an 'edge-detected' video image of the geographic skyline shown in FIG. 2.

Figure 10:
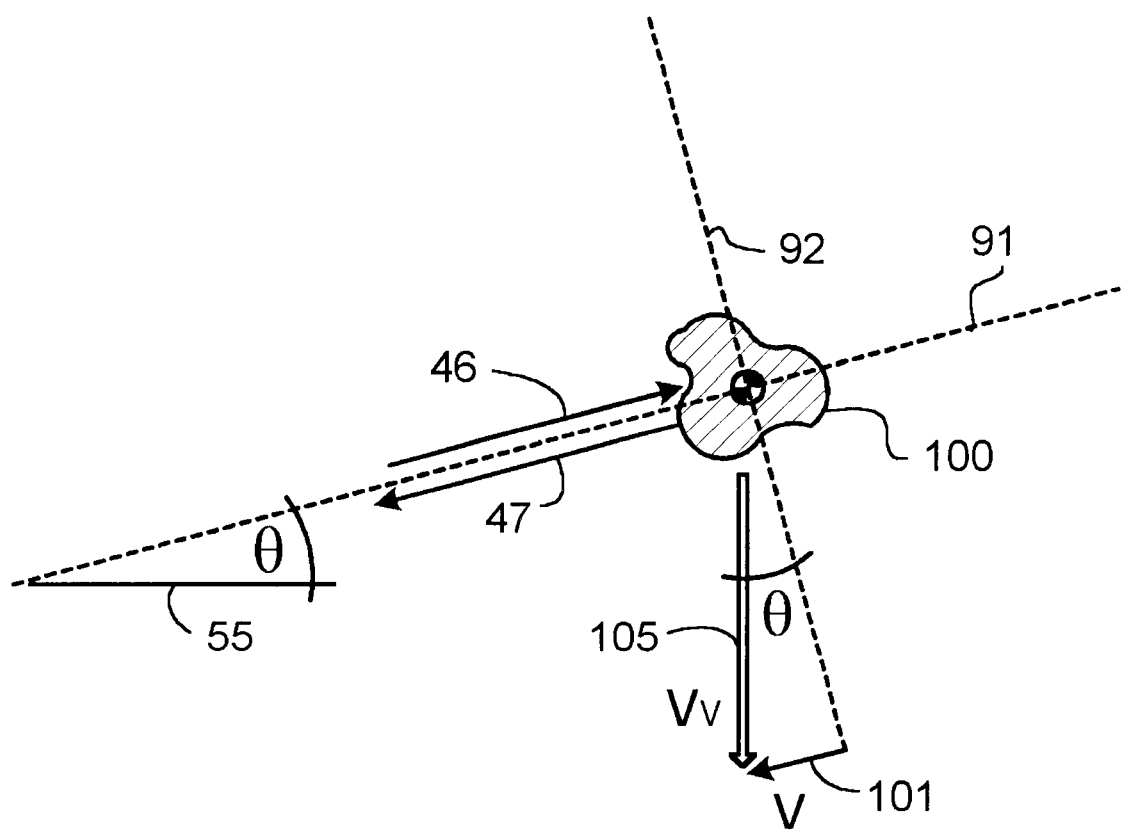

FIG. 10 illustrates the geometric relationship between the vertical moving column of air and the individual laser pulses, where this geometric relationship is used within the method steps of FIG. 6.

DETAILED DESCRIPTION OF THE INVENTION

Mode(s) for Carrying Out the Invention

Referring to FIG. 2, which shows one embodiment of our invention, a robot sentry 40 is scanning just above the surrounding terrain 25. The scanning process consists of transmitting beams 45 of laser pulses and receiving back scatter returns. These back scatter returns result when the laser pulses reflect from individual aerosol particles contained in the air. In order to detect the individual aerosol particles, the laser pulses are both very narrow in diameter, such as 2 microns, and very short in duration, such as <10 nanoseconds. The laser beams 45 are scanned along an observation line 30 above the geographic skyline 20 below which may be flying a helicopter.

Referring next to FIG. 3, the observation line 30 is depicted on a topographical map 50. The observation line 30 is located a varying radial distance 35, that varies with azimuth angle, from the robot sentry 40. The radial (r) distance 35 from each individual point on the observation line 30 is determined by the underlying terrain 25, where the distance (r), for example, is the distance from the robot sentry 40 to the nearest available terrain suitable for masking a helicopter 10. In some embodiments of our invention, the observation line will not fully surround the robot sentry 40, but will instead only cover an angular sector, such as an anticipated attack direction. In other embodiments of our invention, there are concentric observation lines 30, such as would be used in mountain foothill terrain.

Referring next to FIG. 4 as well as the preceding FIGS., the robot sentry 40 detects the presence of a helicopter 10 by detecting a vertical column of air at the observation line 30. The characteristics of this vertical column of air are that it has a diameter equal to the diameter of the rotor intake region, for example 30 feet (10 meters) and the air in the vertical column is moving downward at a relatively high vertical velocity, for example 50 fps (15 m/s). The diameter of the rotor intake region 15 is approximately the same as the helicopter 10 rotor diameter (R).

The air velocity (V) along the propagation direction of an individual laser beam 46 can be determined by a Doppler shift in the laser beam frequency. The laser return can be measured at a specific distance, such as the radial distance 35 to the observation line 30 by setting a 'range gate' on the laser receiver. The vertical speed component of the air velocity is given by the following equation.

$$V_v = V * \sin(\theta);$$

where V is the velocity along the propagation direction of the individual laser beam 46, $V_v$ is the corresponding vertical velocity component, and $\theta$ is the elevation angle between the individual laser beam 46 and the local horizontal reference 55.

A relatively large number of laser 'shots' may be required to detect a vertical column of air, substantially equal vertical wind velocities, over a horizontal distance that is equal to the rotor diameter (R) of the helicopter 10.

Referring next to FIG. 5, a functional block diagram of the robot sentry 40 is shown. The robot sentry includes a laser transmitter 61, laser receiver 62, scanner 63 and processor 65. In one embodiment, the laser scanner 63 includes galvanometer driven horizontal and vertical scanning mirrors 67, similar to those that may be known in the art of laser printers.

The laser transmitter 61 produces the individual laser pulses 46 described previously. The laser pulses 46 are directed to the scanner 63 by a mirror 68 and a prism 69. Each individual laser pulse 46 advantageously has certain characteristics that make it more suitable for detecting the velocities of airborne aerosol particles. These characteristics include, for example, pulse amplitude, pulse length and pulse modulation such as a frequency modulated (FM) 'chirp.

The laser receiver 62 receives the back scatter laser returns 47 from individual aerosol particles through the scanner 63 and the prism 69 and demodulates them. The laser receiver 62 advantageously provides certain functions that make it more suitable for detecting the velocities of airborne aerosol particles at specific predetermined ranges from the robot sentry 40, such as the varying range of the observation line previously described. These functions can include; for example, a selectable (time) range gate and FM demodulation for detecting Doppler frequency shift of the individual back scatter laser returns 47.

Referring now to both FIGS. 4 and 5, the processor 65 first determines (step 81) the location of an observation line 30, where the observation line can be expressed in the radial format of elevation angle versus azimuth direction with respect to the robot sentry 40.

Referring now to FIG. 7 and describing a first embodiment of our invention, embodiment, a video camera 64 included in the robot sentry 40 is used to capture a terrain video image (step 811). The video image is processed using 'edge detection' techniques (step 812), whereby the geographic skyline 20 is represented by a series of elevation versus azimuth points. As an example, FIG. 9 shows an edge-detected video image of the terrain shown in FIG. 2. Referring to both FIGS. 2 and 9, the sky typically will be considerably brighter during the daytime hours than surrounding terrain 25. A geographic skyline 20 is established based on luminance values and contrast ratios, using one of several edge-detection algorithms that may be available in the art of image processing.

In an alternate embodiment of our robot sentry, the processor 65 issues elevation versus azimuth commands 71 to the scanner 63 and uses the laser receiver 62 to detect brightness values directly, in a manner similar to that of a video camera. The resulting brightness data is processed using techniques similar to the edge detection techniques discussed previously.

As previously discussed in conjunction with FIG. 3, the observation line 30 includes a third dimension that can be expressed as range versus azimuth. The observation line 30 is set at a predetermined angular offset, such as for example 0.10°, just above the geographic skyline 20. The ranges of various points along the geographic skyline 20 are actively measured (step 813) by using the laser transmitter 61 in combination with the laser receiver as a laser range finder. The processor 65 issues elevation versus azimuth commands 71 to the scanner 63 that correspond to the geographic skyline 20 that has been previously determined. Typically, the processor 65 will search a predetermined angular offset; for example, ±2° from the detected edge, looking for a hard laser return from a terrain feature by varying the elevation commands 71 to the scanner 63. Accordingly, the processor 65 calculates (step 814) elevation and range versus azimuth for the observation line 30.

In other embodiments, a human operator may manually input the range versus azimuth coordinates of the elevation line, based for example on topographical map data. A computer console may be attached to the robot sentry 40 allowing a human operator to calibrate the equipment, by for example manually operated scanning routines for determining the geographic skyline 20.

Once the observation line 30 has been established, the processor 65 issues commands 71 to the laser scanner 63 to scan (step 82) along the observation line. During the scanning step (step 83), the laser transmitter 61 transmits the laser pulses 46, where the characteristics, such as pulse duration, of each laser pulse 46 are in response to commands issued from the processor 65. Also during the scanning step, the laser receiver 62 receives the laser back scatter returns 47, demodulates these returns, and passes 'raw' data back to the processor 65 for further processing. The processor 65 issues commands to the laser receiver 47, to determine its sensitivity and range gating.

The processor 65 processes (step 84) the laser return raw data. As shown in FIG. 8, this processing includes eliminating (step 841) extraneous return signals, correlating (step 842) the returns to the geographic location of the observation line 30, and detecting (step 843) the Doppler frequency shift of the individual return pulses 47. The velocity (V) of individual aerosol particles, in the direction of the laser pulse 46 propagation is calculated (step 844) in accordance with the geometry of FIG. 10, which is described, below.

Referring back to FIG. 6, the processor 65 compensates (step 85) for wind gusts by averaging the aerosol particle velocities over areas that are much larger than that of a helicopter rotor disc. For example, wind gust velocity over a region 100 meters (300 feet) may be averaged out where this is 10 times the area associated with a helicopter rotor disc. In addition, the local wind behavior, due to cliffs, etc, may be observed during the time period when a helicopter is known not to be in the vicinity. This step (step 85) establishes the 'background' wind conditions against which variances can be observed.

Next, the processor 65 looks for vertical air velocity variances against the background wind conditions established in step 85. The individual vertical air velocities along the observation line 30, corresponding to the vertical movement of individual aerosol particles, are correlated (step 86) to a potential vertical column of air with the area of a helicopter rotor disc, for example 12 meters across. If such a vertical column of air is detected (step 87), the processor issues a threat warning (step 88).

Referring now to FIG. 10, there is shown the geometry associated with detecting the vertical velocity of an individual aerosol particle 100. The individual aerosol particle 100 is moving downward at a vertical velocity 105 and is impinged upon by laser pulse 46. Laser pulse 46 travels in a straight-line propagation direction, defining a first coordinate axis 91. A second coordinate axis 92 is defined perpendicular to the laser pulse 46 propagation direction. The vertical velocity 105 of the aerosol particle 100 can be resolved into this 'propagation direction' coordinate system using basic geometry.

Consider only the vertical velocity of the aerosol particle and disregard horizontal motion, which is compensated for step 85. The vertical velocity component along the propagation axis (V) 101 equals the vertical velocity ($V_v$) of the aerosol particle times the sine of the elevation angle θ. The table below shows some vertical air column speeds with associated elevation angles and the resultant vertical velocity component along the propagation axis (V).

TABLE 1

Vertical Velocity versus Elevation Angle

| Vertical Velocity ($V_v$) (meters/second) | Elevation Angle (θ) (degrees) | Velocity (V) (meters/second) |
|---|---|---|
| 5 | 2.5 | 0.22 |
| 5 | 5.0 | 0.44 |
| 5 | 7.5 | 0.65 |
| 5 | 10.0 | 0.87 |
| 10 | 2.5 | 0.44 |
| 10 | 5.0 | 0.87 |
| 10 | 7.5 | 1.31 |
| 10 | 10.0 | 1.74 |
| 10 | 2.5 | 0.44 |
| 10 | 5.0 | 0.87 |
| 10 | 7.5 | 1.31 |
| 10 | 10.0 | 1.74 |
| 20 | 2.5 | 0.87 |
| 20 | 5.0 | 1.74 |
| 20 | 7.5 | 2.61 |
| 20 | 10.0 | 3.47 |

Accordingly, as described above we have invented both an apparatus and a method to protect ground troops from the threat posed by a potential attacking helicopter that that is using terrain-masking to conceal its presence. Our invention takes advantage of fundamental aerodynamics which dictate that a large mass of air must move essentially in a vertical column through the rotor blades of a helicopter in order for that helicopter to remain airborne. Our invention further takes advantage of modern laser technology that can detect the movement of individual aerosol particles within a moving air stream such as this vertical column of air. Advantageously, ground troops can use our invention for an extra degree of protection from attack helicopters.

Alternate embodiments may be devised without departing from the spirit or the scope of the invention.

What is claimed is:

1. A method of using a robot sentry to detect a helicopter, having a rotor, that is using terrain masking comprising the steps of:

determining the location of an observation line, where this location is selected to be just above a geographic skyline and at a radial distance determined by local terrain;

scanning a laser transmitter to point at and trace along said observation line and to transmit a series of laser pulses at said observation line;

receiving back scatter returns from said laser pulses, where such returns are selectively received so that only returns from distances corresponding to said observation line are considered for further processing; and processing said back scatter returns to determine a vertical velocity component of air movement at said observation line.

2. The method in accordance with claim 1 wherein said vertical velocity is determined in accordance with $$V_v = V^*\sin(\theta),$$

where

V is the velocity along the propagation direction of one of said laser pulses, $V_v$ is a corresponding vertical velocity component, and θ is the elevation angle between the laser beam and a local horizontal reference.

3. The method in accordance with claim 1 wherein said laser pulses have a narrow diameter and a short duration.

4. The method in accordance with claim 1 wherein said laser pulses have a diameter on the order of 2 microns and a duration of less than 10 nanoseconds.

5. The method in accordance with claim 1 further comprising the step of correlating a series of vertical velocity measurements with the rotor diameter of the helicopter; and detecting a vertical column of air that indicates the presence of said terrain-masked helicopter.

6. The method in accordance with claim 1 further comprising the step of:

issuing a threat warning when said helicopter is detected.

7. The method in accordance with claim 1 wherein said geographic skyline is an edge-detected video image.

8. The method in accordance with claim 1 wherein said geographic skyline is detected by:

(a) issuing elevation and azimuth commands to a laser receiver; and (b) processing brightness values in a manner similar to a video camera.

9. The method in accordance with claim 1 wherein the range and elevation versus azimuth coordinates that define said observation line are manually input.

10. A method of determining the location of an observation line that is suitably located for detecting a terrain-masked helicopter, said method comprising the steps of:

(a) capturing a terrain video image;

(b) edge-detecting said terrain video image to determine a plurality of elevation versus azimuth terrain points, thereby defining a geographic skyline;

(c) laser-ranging to said plurality of terrain points; and (d) calculating a plurality of elevation and range versus azimuth points, thereby defining a observation line, where the elevation angle of each points defining said observation line is offset from a corresponding terrain point defining said geographic skyline by a predetermined angular offset.

11. The method in accordance with claim 10 wherein said predetermined angular offset is 0.10 degrees.

12. The method of detecting a terrain-masked helicopter, using a robot sentry, said method comprising the steps of:

(a) capturing a terrain video image from said robot sentry for a predetermined azimuthal range;

(b) edge-detecting said terrain video image to determine a plurality of elevation versus azimuth terrain points, thereby defining a geographic skyline;

(c) laser-ranging to said plurality of terrain points, thereby determining a radial distance versus azimuth for each of said terrain points;

(d) calculating an observation elevation versus azimuth for each of said terrain points, where said observation elevation is offset from the elevation of said geographic skyline at each terrain point by a predetermined angular offset;

(e) defining an observation line based on a plurality of three-dimensional coordinates of radial distance and observation elevation versus azimuth over said predetermined azimuthal range;

(f) scanning a laser transmitter to point at and trace along said observation line and to transmit a series of laser pulses at said observation line;

(g) receiving back scatter returns from said laser pulses, where such returns are selectively received so that only returns from distances corresponding to said observation line are considered for further processing;

(h) processing said back scatter returns to determine a vertical velocity component of air movement at said observation line;

(i) correlating a series of vertical velocity measurements with the rotor diameter of the helicopter; and (j) detecting a vertical column of air that indicates the presence of said terrain-masked helicopter.

13. The method in accordance with claim 12 wherein said predetermined angular offset is 0.10 degrees.

* * * * *